(12) United States Patent
Jeter, Jr. et al.

(10) Patent No.: US 7,194,568 B2
(45) Date of Patent: Mar. 20, 2007

(54) SYSTEM AND METHOD FOR DYNAMIC MIRROR-BANK ADDRESSING

(75) Inventors: Robert E. Jeter, Jr., Morrisville, NC (US); Kenneth H. Potter, Jr., Raleigh, NC (US)

(73) Assignee: Cisco Technology, Inc., San Jose, CA (US)

(*) Notice: Subject to any disclaimer, the term of this patent is extended or adjusted under 35 U.S.C. 154(b) by 502 days.

(21) Appl. No.: 10/394,984

(22) Filed: Mar. 21, 2003

(65) Prior Publication Data

US 2004/0186945 A1 Sep. 23, 2004

(51) Int. Cl.
G06F 12/06 (2006.01)
G06F 12/16 (2006.01)

(52) U.S. Cl. .......................... 711/5; 711/154; 711/155; 711/168; 714/6

(58) Field of Classification Search ................ None
See application file for complete search history.

(56) References Cited

U.S. PATENT DOCUMENTS

| | | | |
|---|---|---|---|
| 4,096,571 A | 6/1978 | Vander Mey | |
| 4,400,768 A | 8/1983 | Tomlinson | |
| 4,918,600 A | 4/1990 | Harper, III | |
| 5,088,032 A | 2/1992 | Bosack | |
| 5,247,645 A | 9/1993 | Mirza | |
| 5,394,553 A | 2/1995 | Lee | |
| 5,428,803 A | 6/1995 | Chen | |
| 5,479,624 A | 12/1995 | Lee | |
| 5,561,669 A | 10/1996 | Lenney et al. | |
| 5,561,784 A | 10/1996 | Chen | |
| 5,617,421 A | 4/1997 | Chin | |
| 5,724,600 A | 3/1998 | Ogi | |
| 5,740,171 A | 4/1998 | Mazzola et al. | |
| 5,742,604 A | 4/1998 | Edsall et al. | |
| 5,764,636 A | 6/1998 | Edsall | |
| 5,787,255 A | 7/1998 | Parlan et al. | |
| 5,787,485 A * | 7/1998 | Fitzgerald et al. | .......... 711/162 |
| 5,796,732 A | 8/1998 | Mazzola et al. | |

(Continued)

FOREIGN PATENT DOCUMENTS

EP     0744696 A     11/1996

OTHER PUBLICATIONS

U.S. Appl. No. 10/217,023, Robert E. Jeter.

(Continued)

*Primary Examiner*—Gary Portka
(74) *Attorney, Agent, or Firm*—Cesari and McKenna LLP

(57) ABSTRACT

A dynamic addressing technique mirrors data across multiple banks of a memory resource. Information stored in the memory banks is organized into separately addressable blocks, and memory addresses include a mirror flag. To write information mirrored across two memory banks, a processor issues a single write transaction with the mirror flag asserted. A memory controller detects that the mirror flag is asserted and, in response, waits for both memory banks to become available. At that point, the memory controller causes the write to be performed at both banks. To read data that has been mirrored across two memory banks, the processor issues a read with the mirror flag asserted. The memory controller checks the availability of both banks having the desired information. If either bank is available, the read request is accepted and the desired data is retrieved from the available bank and returned to the processor.

63 Claims, 5 Drawing Sheets

U.S. PATENT DOCUMENTS

| | | | |
|---|---|---|---|
| 5,838,915 | A | 11/1998 | Klausmeier et al. |
| 5,852,607 | A | 12/1998 | Chin |
| 5,909,550 | A | 6/1999 | Shankar et al. |
| 5,982,655 | A | 11/1999 | Doyle |
| 6,026,464 | A | 2/2000 | Cohen |
| 6,119,215 | A | 9/2000 | Key et al. |
| 6,178,429 | B1 | 1/2001 | Cherf |
| 6,195,107 | B1 | 2/2001 | Iverson |
| 6,272,621 | B1 | 8/2001 | Key et al. |
| 6,308,219 | B1 | 10/2001 | Hughes |
| 6,487,202 | B1 | 11/2002 | Klausmeier et al. |
| 6,487,591 | B1 | 11/2002 | Budhraja et al. |
| 6,505,269 | B1 | 1/2003 | Potter |
| 6,535,963 | B1 | 3/2003 | Rivers |
| 6,795,901 | B1 * | 9/2004 | Florek et al. ............... 711/152 |
| 6,804,162 | B1 * | 10/2004 | Eldridge et al. ....... 365/230.03 |
| 6,839,797 | B2 * | 1/2005 | Calle et al. .................... 711/5 |
| 2001/0001871 | A1 | 5/2001 | Rust et al. |

OTHER PUBLICATIONS

U.S. Appl. No. 10/320,120, Jeter et al.
U.S. Appl. No. 10/320,162, Jeter et al.
"Mirroring of Data on a Partition Basis" Research Disclosure, Kenneth Mason Publications, Hampshire, GB No. 315, Jul. 1, 1990 p. 543, XP000134126 ISSN: 0374-4353.
PCT/US2004/005522, International Search Report, Oct. 18, 2004.

* cited by examiner

SYSTEM AND METHOD FOR DYNAMIC MIRROR-BANK ADDRESSING

BACKGROUND OF THE INVENTION

1. Field of the Invention

The present invention relates to computer systems and, more specifically, to mirroring data across multiple memory resources, such as memory banks.

2. Background Information

High-performance computer systems often utilize multiple processors or central processing units (CPUs). Each processor may have access to shared as well as private data, such as program instructions, e.g., algorithms, as well as data, that are stored in a memory coupled to the processors. One of the more common multiprocessor architectures is known as a systolic array in which each processor is coupled to its nearest neighbors in a mesh-like topology, and the processors perform a sequence of operations on the data that flows between them. Typically, the processors of a systolic array operate in "lock-step" with each processor alternating between a compute phase and a communicate phase.

Systolic arrays are often used when the problem being solved can be partitioned into discrete units of works. In the case of a one-dimensional (1-D) systolic array comprising a single "row" of processors, each processor is responsible for executing a distinct set of instructions on input data so as to generate output data which is then passed (possibly with additional input data) to a next processor of the array. To maximize throughput, the problem is divided such that each processor requires approximately the same amount time to complete its portion of the work. In this way, new input data can be "pipelined" into the array at a rate equivalent to the processing time of each processor, with as many units of input data being processed in parallel as there are processors in the array. Performance can be improved by adding more processors to the array as long as the problem can continue to be divided into smaller units of work. Once this dividing limit has been reached, processing capacity may be further increased by configuring multiple rows in parallel, with new input data allocated to the first processor of a next row of the array in sequence.

One place where multiprocessor architectures, such as systolic arrays, can be advantageously employed is in the area of data communications. In particular, systolic arrays have been used in the forwarding engines of intermediate network stations or nodes, such as routers. An intermediate node interconnects communication links and sub-networks of a computer network through a series of ports to enable the exchange of data between two or more end nodes of the computer network. The end nodes typically communicate by exchanging discrete packets or frames according to predefined protocols, such as the Transmission Control Protocol/Internet Protocol (TCP/IP) or the Internetwork Packet eXchange (IPX) protocol. The forwarding engine is often used by the intermediate node to process packets received on the various ports. This processing may include determining the destination of a packet, such as an output port, and placing the packet on an output queue associated with the destination.

The multiple processors of a forwarding engine typically have shared access to one or more memory resources, at which information needed by all of the processors, such as forwarding tables, is stored. Each memory resource, moreover, may consist of a plurality of memory banks. To ensure a consistent "view" of the data by the multiple processors, locks are often placed on the different memory resources and/or banks while they are being accessed. For example, a processor seeking to read information from a given bank locks the bank so that other processors cannot modify its contents, while the read is executing. Similarly, a processor seeking to write information also locks the respective bank so that other processors cannot read from the bank until the write operation is complete. Although such locking mechanisms ensure data consistency, they often result in delays when multiple processors try to access information from the same bank.

To reduce or eliminate such delays, it is known to copy contents of one memory bank into another memory bank. For example, if the memory resource has four banks, then the contents of bank 0 (B0) may be mirrored to bank 2 (B2), and the contents of bank 1 (B1) may be mirrored to bank 3 (B3). That is, the contents of banks B2–B3 are a mirror of the contents of banks B0–B1. To take advantage of this arrangement, each processor is assigned to one of two groups, and each group is allowed to access only one of the mirrored set of banks. In other words, the first group of processors utilizes banks B0–B1, while the second group of processors utilizes banks B2–B3. If a processor from the first group needs to read information stored at bank B1, it only locks bank B1, leaving bank B3, which contains an identical copy of the information at bank B1, unlocked. Accordingly, a processor from the second group may still access bank B3 even though bank B1 is locked. In this way, a processor from each group can read the same information simultaneously.

To implement such a mirroring arrangement, the processors typically execute reader code and writer code. The reader code for the processors is predefined to target the memory banks to which the processor is associated, e.g., banks B0–B1 or banks B2–B3. The reader code executes a loop, e.g., a spinlock, until the processor obtains a lock on the particular memory bank, e.g., bank B1, that is being read. Once the lock is obtained, the processor issues the read operation and the results returned to the requesting processor. The processor then releases the lock, thereby allowing another processor to access memory bank B1. Because all information is mirrored at two banks, a write must be performed at both locations to maintain data consistency. In this case, the writer code executes a spinlock until a lock is obtained on both banks, e.g., bank B1 and bank B3. Once both banks are locked, the processor issues the two write operations. Following the completion of the two writes, the locks are released, thereby allowing the two banks to be accessed by other processors.

In addition, a shared memory resource often imposes some type of arbitration on the processors trying to access the resource. Through arbitration, the memory resource tries to prevent one processor from repeatedly gaining access to the memory resource, and thus repeatedly blocking the other processors from gaining access. A typical arbitration scheme will force a processor that just accessed the memory resource to wait until all of the other processors have been given a chance to access the memory resource before allowing the original processor to access the memory resource a second time. As mentioned above, a processor writing to a mirrored memory bank issues two write operations, one to each of the memory banks. Assuming the memory resource implements an arbitration scheme, the processor, after issuing the first write, will then have to wait until all of the other processors have been given a chance to access the memory resource, before the processor will be permitted to issue the second write. Nonetheless, because the processor locked both banks before issuing the writes, both banks will remain locked this entire time. As a result, other processors will be blocked from accessing either bank until both writes are allowed to complete. This can reduce the efficiency of the system.

Accordingly, a need exists for a more efficient memory resource mechanism.

SUMMARY OF THE INVENTION

The present invention provides a dynamic addressing technique for mirroring data across multiple banks of a memory resource and for accessing that data efficiently. The memory resource is preferably disposed in a system having a plurality of processors and a memory controller operatively coupled to the memory resource. Each of the processors can issue requests to the memory controller in order to access the memory resource. The memory controller includes a plurality of buffers for storing the requests, and an arbiter for determining the order in which the buffered memory requests will be granted access to the banks of the memory resource. Information stored in the memory banks is preferably organized into separately addressable units, such as memory blocks. Each memory address, moreover, is configured to include a mirror flag field that can be asserted or de-asserted by the processor issuing the respective request.

In accordance with the invention, to write information mirrored at two memory banks, a processor issues a single write with the mirror flag field asserted. The memory controller detects that the mirror flag of the write is asserted and, in response, waits for both memory banks to become available. At that point, the memory controller causes the write to be performed at both banks. Significantly, the memory controller is configured to ensure that both memory banks will be updated in accordance with the write before any other requests will be permitted to access the subject memory banks. Advantageously, neither of the memory banks needs to be locked for the writes to be competed.

Furthermore, a processor that wishes to read data that has been mirrored across two memory banks can receive that data from either memory bank, even though the read specifies only one of the two banks. More specifically, the processor preferably issues a read request to the memory controller specifying the desired memory address. In addition, the processor preferably asserts the mirror flag field of the specified memory address. Although the request only specifies one memory bank, because the mirror flag field is asserted, the memory controller checks the availability of both banks having the desired information. That is, the memory controller checks the specified memory bank as well as the bank that is the mirror of the specified bank. If either memory bank is available, the read request is accepted and the desired data is retrieved from the memory bank that was available and returned to the processor. Again, the processor does not have lock the memory bank before issuing its read. Instead, the memory controller is configured to prevent other requests targeting this same memory bank from moving ahead of the read request. In addition, rather than mirroring data on a bank-level, the present invention mirrors data on a block-level. Thus, the system allows mirroring of selected memory blocks, e.g., a frequently accessed table, from one bank to another, rather than having to mirror the entire contents of the memory banks. Accordingly, the present invention dramatically increases the memory resource's effective storage space.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
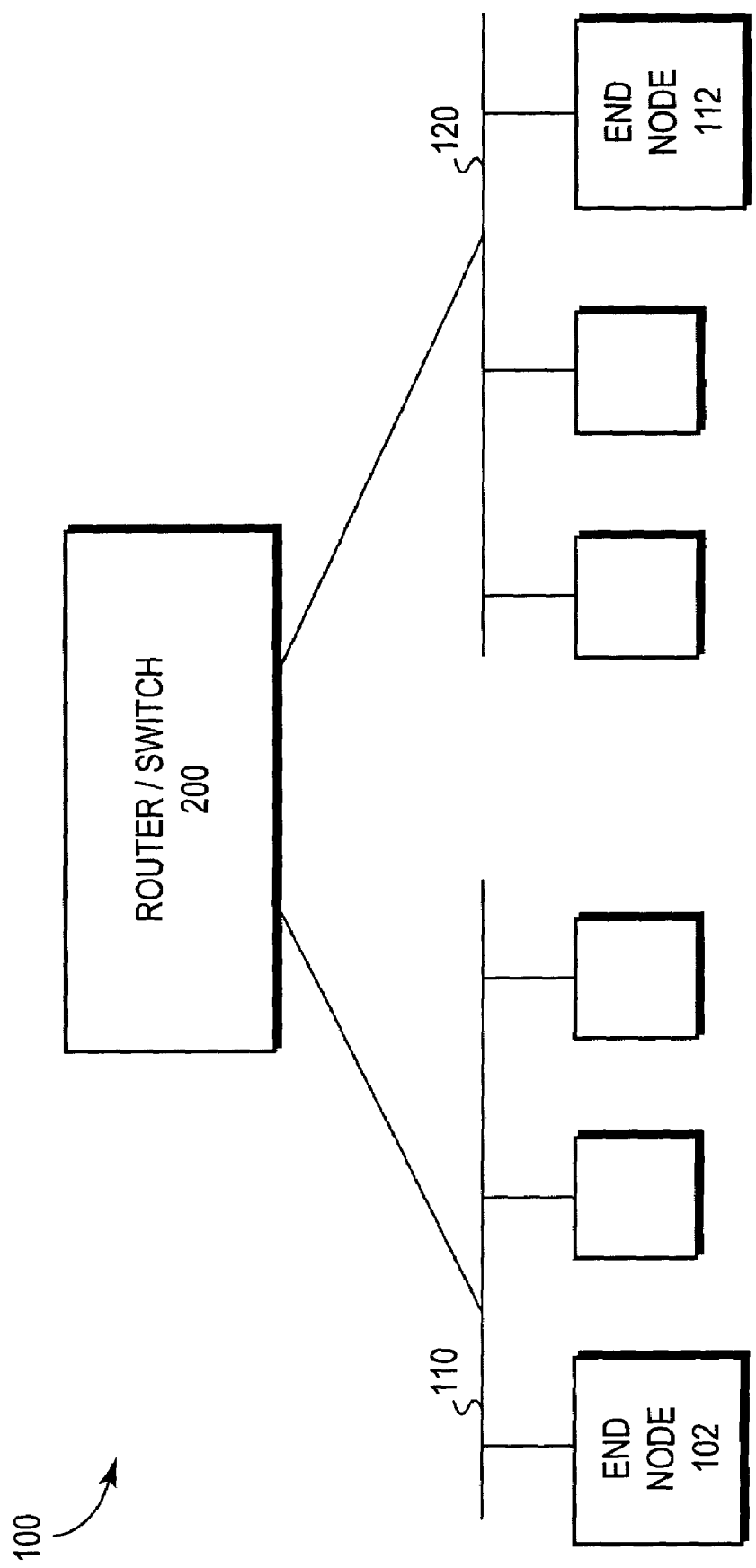
FIG. 1 is a block diagram of a computer network comprising a collection of interconnected communication media and subnetworks attached to a plurality of end nodes.

FIG. 1 is a block diagram of a computer network 100 comprising a collection of interconnected communication media and subnetworks attached to a plurality of stations. The stations are typically computers comprising end nodes 102 and 112 and an intermediate network node 200. The intermediate node 200 may be a router or a network switch, whereas the end nodes 102 and 112 may include personal computers, workstations, servers, personal digital assistants (PDAs), etc. The subnetworks generally comprise local area networks (LANs) 110 and 120, although the invention may work advantageously with other communication media configurations such as point-to-point network links, wide area networks (WANs), wireless networks, etc. Communication among the stations of the network is typically effected by exchanging discrete network messages, such as frames or packets, between the communicating end nodes according to a predefined protocol, such as the Internet protocol (IP), the Internet Packet Exchange (IPX) protocol, the AppleTalk protocol, the DECNet protocol, etc.

Figure 2:
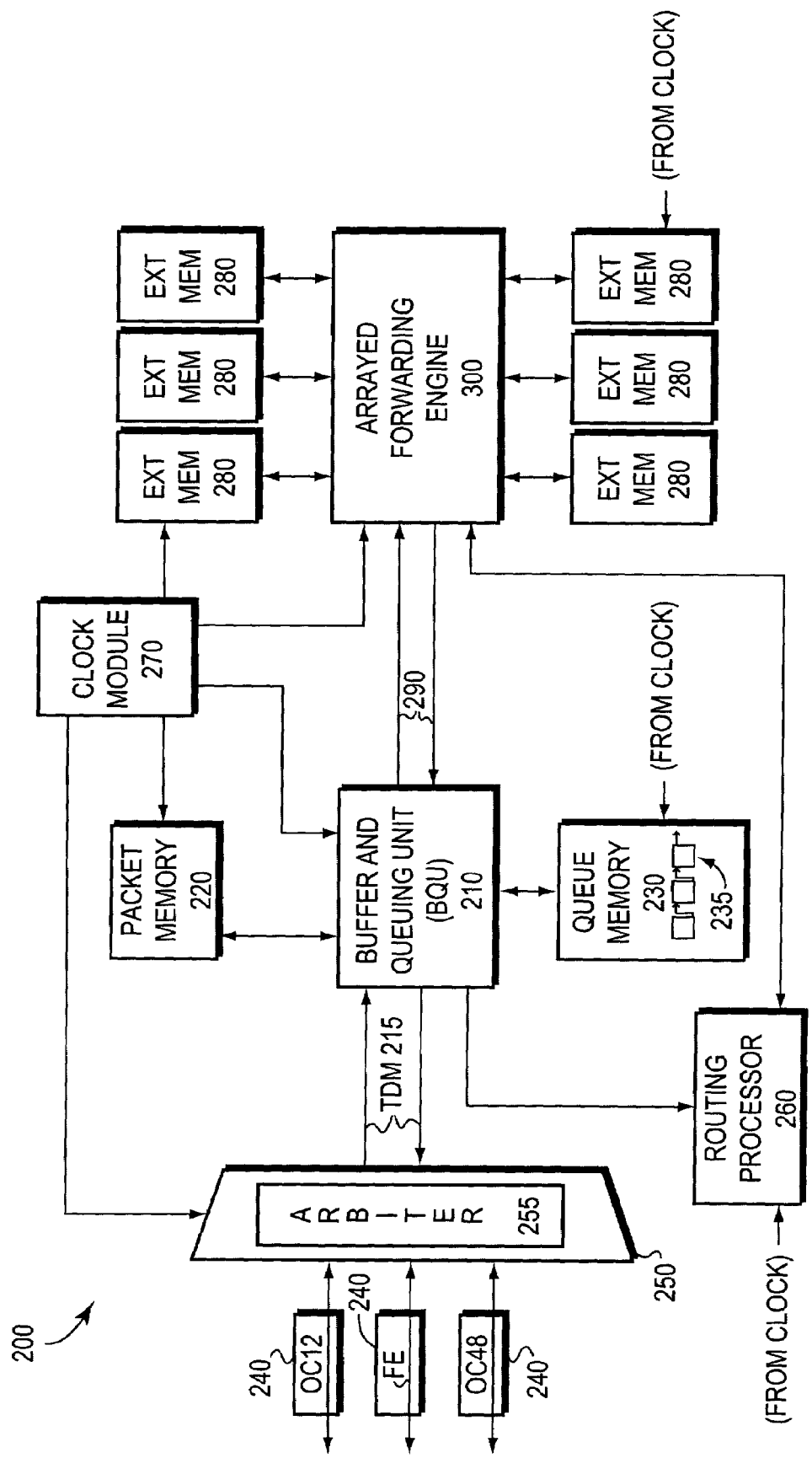
FIG. 2 is a partial schematic block diagram of an intermediate network node, such as a network switch, that may be advantageously used with the present invention.

FIG. 2 is a partial schematic block diagram of intermediate node 200 that, in the illustrative embodiment, is preferably a network switch. Node 200 generally performs layer two (L2) processing functions, such as "cut-through" operations wherein an entire frame does not have to be stored before transfer to a destination. In addition, node 200 also implements layer three (L3) forwarding operations and route processing. A feature of the architecture described herein is the ability to program node 200 to execute L2, L3 or higher-layer operations. To that end, operation of node 200 will be described with respect to switching of network packets, although it may be programmed for additional or other applications, such as data encryption, flow control, etc.

Intermediate node 200 comprises a plurality of interconnected components including an arrayed forwarding engine 300, various memories such as external memory (Ext Mem) resources 280, a buffer and queueing unit (BQU) 210 and network port interface cards 240. Operations of these components are preferably synchronously controlled by a clock module 270 although the arrayed elements of the forwarding engine 300 may run asynchronously. In the illustrative embodiment, the clock module 270 globally distributes its clock signals via clock lines to the components of node 200.

The external memory resources 280 generally comprise random access memory (RAM) storage locations addressable by the forwarding engine 300 for storing software programs and data structures accessed by the components.

An operating system, portions of which may be resident in the external memories 280 and executed by the engine 300, functionally organizes the node 200 by, inter alia, invoking network operations in support of software processes executing on the node 200. It will be apparent to those skilled in the art that other memory devices, including various computer readable media, may be used for storing and executing program instructions.

As shown, the arrayed forwarding engine 300 is coupled to the external memory (Ext Mem) resources 280. The buffer and queuing unit (BQU) 210 is connected to a packet memory 220 for storing packets and to a queue memory 230 for storing headers of the packets on data structures, such as linked lists, that may be organized as queues 235. The BQU 210 further comprises data interface circuitry for interconnecting the forwarding engine 300 with a plurality of line cards 240 via a selector circuit 250 having an arbiter 255. The line cards 240 may comprise, e.g., Optical Carrier Level 12 (OC12), Optical Carrier Level 48 (OC48) and Fast Ethernet (FE) ports, each of which includes conventional interface circuitry that incorporates the signal, electrical and mechanical characteristics, and interchange circuits, needed to interface with the physical media and protocols running over that media. A typical configuration of the intermediate node 200 may include numerous input/output channels on these interfaces, each of which is associated with at least one queue 235 in the queue memory 230. The forwarding engine 300 generally functions as a switching processor that modifies packets and/or headers in sequence as the BQU 210 implements queuing operations.

A routing processor 260 executes conventional routing protocols for communication directly with the forwarding engine 300. The routing protocols generally comprise topological information exchanges between end nodes to determine optimal paths through the network based on, e.g., destination IP addresses. These protocols provide information used by the routing processor 260 to create and maintain routing tables (not shown). The tables may be loaded into the external memories 280 as forwarding information base (FIB) tables used by the forwarding engine 300 to perform forwarding operations. When processing a header in accordance with IP switching, engine 300 determines where to send the packet by indexing into the FIB tables using an IP address of the header. Execution of the forwarding operations results in destination media access control (MAC) addresses of the headers being rewritten by the forwarding engine 300 to identify output ports for the packets.

Figure 3:
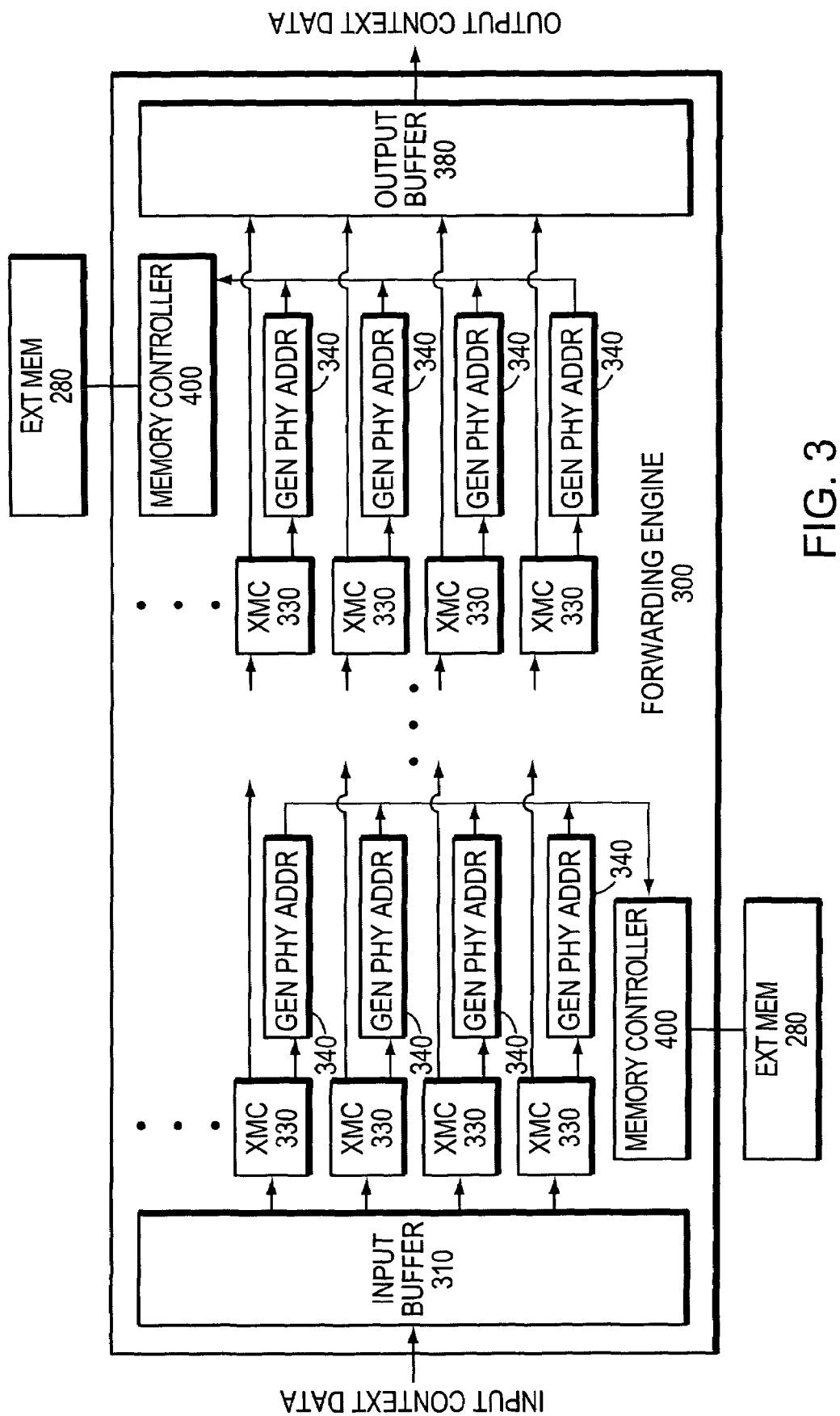
FIG. 3 is a partial schematic block diagram of the forwarding engine of the node of FIG. 2 having a plurality of processors organized as a multi-dimensional systolic array.

FIG. 3 is a partial schematic block diagram of forwarding engine 300 comprising a plurality of processing elements, such as processors (XMCs) 330, organized as a multidimensional systolic array. Each processor 330 is illustratively a pipelined processor that includes, inter alia, a plurality of arithmetic logic units (ALUs) and a register file having a plurality of general purpose registers that store intermediate result information processed by the ALUs. The processors 330 may be arrayed into multiple rows and columns. In the illustration of FIG. 3, the processors 330 are arrayed as eight (8) rows (although only four rows are shown) and four (4) columns (although only two are shown) in an 8×4 arrayed configuration that is embedded between an input buffer 310 and an output buffer 380. In the preferred embodiment, the processors are arranged in an 8×2 array, although other arrangements, including 4×4, 4×8, or 8×1 arrayed configurations, among others, might be advantageously used with the present invention.

The processors 330 of each row are configured as a "pipeline" to sequentially execute operations on transient data (e.g., packet headers), also herein referred to as context data, whereas the processors 330 of each column operate in parallel to perform substantially the same operation on the transient data, but with a shifted phase. Each phase comprises a predetermined period of cycles, e.g., 128 cycles. Sequencing circuitry (not shown) controls the processors 330 of each pipeline by ensuring that each processor 330 completes processing of current transient data before loading new transient data into the pipeline at a new phase. In general, a new phase of processing is started, i.e., a context switch is performed, when all of the processors 330 finish processing their current context and a new, incoming context is completely received.

As described above, the forwarding engine 300 is coupled to a plurality of external memory (Ext Mem) resources 280 via memory controllers 400. Each external memory resource 280 is preferably one or more reduced-latency-random-access-memory (RLDRAM) devices, each of which has a plurality of banks. Nonetheless, those skilled in the art will recognize that other memory devices, such as fast-cycle-random-access-memory (FCRAM) devices or even synchronous-random-access-memory (SRAM) devices could be used. The external memory resources 280 are preferably used to store non-transient data (e.g., forwarding tables, queues, etc.) organized as a series of data structures for use in processing the transient data. Associated with each processor 330 is a generate physical address (GEN PHY ADDR) circuit 340 that converts logical memory addresses as issued by the processors as part of memory access requests into corresponding physical addresses. The GEN PHY ADDR circuits 340 may be disposed along the line or bus that couples the processors to the memory controller 400. It should be understood that lines (not shown) also extend from the memory controllers 400 back to the processors 330 to return information thereto. In addition, each processor 330 preferably has a memory management unit (MMU) (not shown) for interfacing with the memory controllers 400 and external memories 280. The GEN PHY ADDR circuits 340 may be part of the MMUs.

A suitable platform for intermediate node 200 is the 7200 series of routers from Cisco Systems, Inc. of San Jose, Calif.

Figure 4:
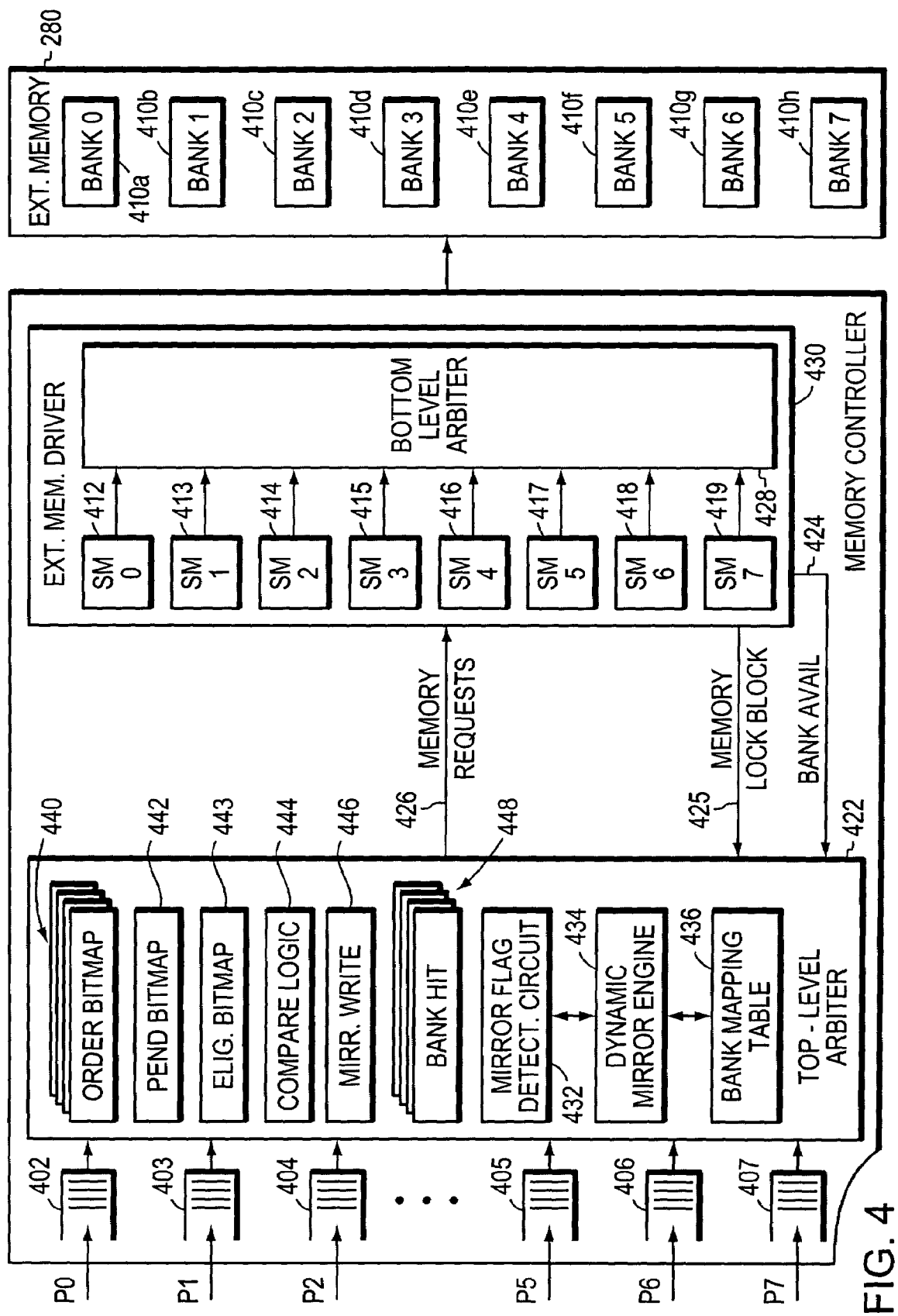
FIG. 4 is a schematic illustration of a memory controller in accordance with the present invention.

FIG. 4 is a partial schematic block diagram of a memory controller 400 in accordance with the present invention. The memory controller 400 includes a plurality of request queues 402–407 (only some of which are shown). Each request queue receives and buffers memory access requests that are received at the memory controller 400 from one of the processors coupled thereto. Request queue 402, for example, receives and buffers memory access requests issued by processor P0, request queue 403 receives and buffers memory access requests issued by processor P1, request queue 404 receives and buffers memory access requests issued by processor P2, and so on. Each queue has a head and a tail. As requests are received they are placed at the tail of the respective request queue. Illustratively, each queue is capable of holding up to eight requests.

Coupled to the memory controller 400 is its respective external memory 280, which has a plurality of, e.g., eight, banks 410a–h. Each bank stores a fixed amount of information, e.g., 4 Megabytes (MB) for a total of 32 MB of memory per external memory resource 280. The memory controller 400 also has a plurality of state machines 412–419, one for each memory bank. State machine 412 (SM0), for example, is associated with memory bank 410a (B0), state machine 413 (SM1) is associated with memory bank 410b (B1), state machine 414 (SM 2) is associated with memory bank 410c (B2), and so on. Each state machine 412–419 transitions among a plurality of states, including an available state and a busy state, for its respective memory bank.

Memory controller 400 preferably implements a two-level arbitration scheme for determining which memory access requests are to be executed during any given memory access cycle. Specifically, memory controller 400 has a top-level arbiter 422 that checks which of the request queues have outstanding memory access requests. The top-level arbiter 422 also receives information regarding which of the state machines 412–419 are available to receive a memory access request, as indicated by bank availability (BANK AVAIL) signal 424, and MEMORY LOCK BLOCK signal 425. As explained herein, the top-level arbiter 422 selects one request per cycle from the request queues 402–407 for issuance to the bank state machine targeted by the selected request as determined by the memory address associated with the request. The request is passed to the specified state machine as indicated by arrow 426. The selected request is preferably the oldest request whose desired state machine is available and not blocked by a memory lock or an earlier mirrored write request or atomic transaction. The second level of arbitration is executed by a bottom-level arbiter 428 that is in communicating relationship with the state machines 412–419 and the external memory 280. In general, the bottom-level arbiter 428 takes the oldest request from the state machines 412–419 and issues it to the external memory 280, taking into account the availability of the required resources, e.g., busses, etc. The state machines 412–419 and the bottom-level arbiter 428 may be disposed at an external memory driver 430.

In accordance with the invention, the memory controller 400 further includes a mirror flag detection circuit 432 that examines the memory address contained in memory access requests, a dynamic mirror engine 434 that executes the dynamic mirror bank addressing scheme of the present invention and a bank mapping table 436 that indicates which companion memory bank, e.g., bank 410$h$ (B7), contains mirrored data for each memory bank, e.g., bank 410$d$ (B3). In the illustrated embodiment, the components 432, 434 and 436 are all disposed at the top-level arbiter 422.

In order to execute its arbitration functions, the top-level arbiter 422 preferably includes a plurality of registers or bitmaps that it examines and manipulates in order to select a request for issuance to the state machines. Specifically, top-level arbiter 422 has a plurality of order bitmaps indicated generally at 440, e.g., one for each request queue, a global pending (PEND) bitmap 442, a global eligible bitmap 443, and compare logic 444. As described herein, the top-level arbiter 422 further includes a global mirror-write request bitmap 446 and a plurality of bank-hit bitmaps 448. The order bitmaps 440 indicate how long each particular request has been waiting at the head of its respective request queue. The PEND bitmap 442, which is used to set the order bitmaps, indicates which requests have yet to be issued. The eligible bitmap 443 indicates which requests are eligible to be issued to the state machines 412–419. Based on the information in the order and eligible bitmaps, the compare logic 444 determines which of the requests currently at the head of the request queues are allowed, and thus which are blocked. Specifically, the compare logic 444 preferably performs a logical AND operation on the order and eligible bitmaps 440, 443 every cycle to determine which request will be sent to its state machine during that cycle.

Each order bitmap 440 preferably has a plurality of 1-bit fields, where each bit is associated with a particular request queue. Each of the order bitmaps 440 is preferably set by the top-level arbiter 422 to indicate which requests that are at the head of their request queues are older than the request with which the particular order bitmap is associated. Specifically, when a new request reaches the head of its request queue, the compare logic 444 performs a logical OR operation on the PEND bitmap 442 and any other requests that have a lower processor ID value and that also just reached the head of their request queues. The result of this logical OR operation is then entered in the order bitmap associated with the new request.

The global PEND bitmap 442 has a plurality of 1-bit fields, where each bit is associated with a particular one of the request queues. Upon issuing the allowed request to the state machines, i.e., during every cycle of the top-level arbiter 422, the compare logic 444 asserts each bit of the global PEND bitmap 442 that corresponds to a request queue that still has a request at its head awaiting issuance to the state machines.

The global eligible bitmap 443 also has a plurality of 1-bit fields, where each bit is associated with a particular request queue. Each bit of the eligible bitmap 443 is preferably set by the top-level arbiter 422 to indicate which requests that are at the head of their request queues are eligible to be issued to the respective state machines 412–419. In particular, if a state machine is currently unavailable or it is blocked by a memory lock, the bit position of the eligible bitmap 443 corresponding to a processor request targeting that state machine is preferably de-asserted. Thus, those bit positions that remain asserted represent requests that eligible for issuance.

The memory controller 400 is preferably implemented in hardware through one or more Application Specific Integrated Circuits (ASICs) or Field Programmable Gate Arrays (FPGAs). Nonetheless, those skilled in the art will recognize that various combinations of hardware and software, including firmware, may be utilized. In fact, the functional aspects of the memory controller 400 could be implemented solely through software stored on a storage medium, such as Read Only Memory (ROM) and executed by one or more processing elements.

In operation, the processors 330 (FIG. 3) of the forwarding engine 300 issue memory access requests, such as Reads, Writes and Atomic Transactions to the respective memory controller 400. An Atomic Transaction, such as a read-modify-write, comprises multiple operations that must all be performed without interruption. The memory controller 400 causes the Reads, Writes and Atomic Transactions to be performed at the external memory 280 and, where appropriate, returns the requested data to the processor 330. The term "data" is intended to be used in its broadest sense to include any information, such as table entries, words, strings, values, instructions, semaphores, etc. The information stored at the external memories 280 is preferably organized into separately addressable memory blocks or, more simply, blocks. In the preferred embodiment, each memory block contains 64 bits of data and eight bits of error correction code (ECC) for a total of 72 bits. Nonetheless, those skilled in the art will recognize that other sizes may be employed. A processor 330 specifies a particular block by appending its logical address to the request.

The processors 330 are preferably configured with reader code and writer code, which may be referred to as microcode, for use in generating and issuing memory access requests. In the prior art systems, the reader code and writer code indicates which set of memory banks the respective processor is to use. For example, the microcode at processors P0–P3 may specify that these processors are to target memory banks B0–B3, while a different microcode at processors P4–P7 specifies that these processors are to target memory banks B4–B7. With the present invention, the same reader code and writer code may be used at all of the processors. That is, there is no need to associate the processors with particular memory banks.

It should be understood that the processors 330 (FIG. 3) and memory controllers 400 may utilize a flow control mechanism to prevent the MMU at a processor from issuing additional memory access requests when that processor's request queue is full.

Figure 5:
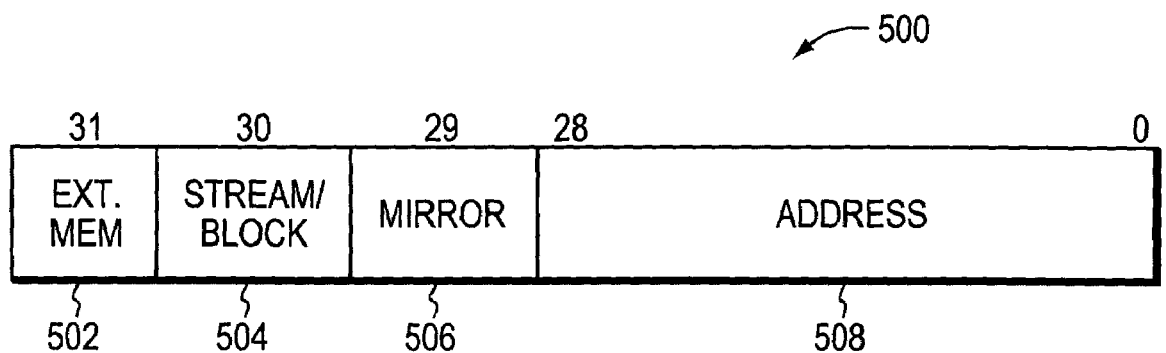
FIGS. 5 and 6 are schematic illustrations of memory addresses in accordance with the present invention.

FIG. 5 is a highly schematic illustration of the format of a logical address 500 suitable for use with the present invention. Logical address 500 is preferably 32 bits in length and is organized into a plurality of fields. In particular, logical address 500 has a 1-bit external memory flag 502 at bit position 31, a 1-bit stream/block flag 504 at bit position 30, a 1-bit mirror flag 506 at bit position 29 and a 28-bit logical address field 508 that holds the logical address. If asserted, the external memory flag indicates that the memory block corresponding to this logical address is at external memory 280. The stream/block flag indicates whether the logical address of field 508 is a stream address or a block address. A suitable mechanism for implementing stream and block addressing modes is described in commonly owned, U.S. Pat. No. 6,505,269 for a Dynamic Addressing Mapping to Eliminate Memory Resource Contention in a Symmetrical Multiprocessor System, which is hereby incorporated by reference in its entirety.

Logical addresses are converted into physical addresses by the processor's respective GEN PHY ADDR circuit 340. The GEN PHY ADDR circuit 340 may utilize one or more translation look-aside buffers (TLBs) (not shown) in order to translate logical addresses to physical addresses.

Figure 6:
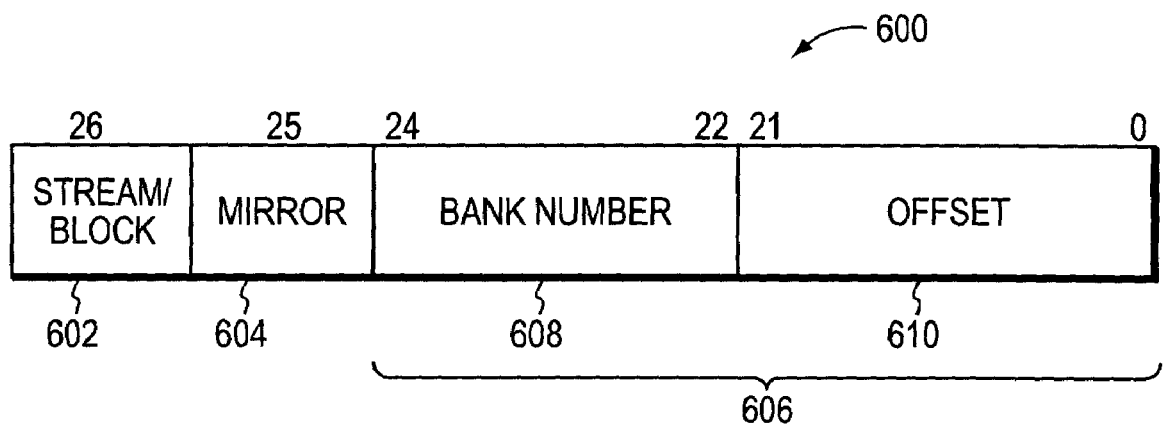

FIG. 6 is a highly schematic illustration of the format of a physical address 600 as converted by a GEN PHY ADDR circuit 340. Physical address 600 is preferably 27 bits in length and is also organized into a plurality of fields. In particular, physical address 600 has a 1-bit stream/block flag 602 at bit position 26, a 1-bit mirror flag 604 at bit position 25, and a 25-bit physical address field 606 that, in turn, has a bank number sub-field 608 and an offset field 610. The GEN PHY ADDR circuit 340 copies the contents of the stream block flag field 504 and the contents of the mirror flag field 506 of the logical address 500 into corresponding fields 602 and 604 of the physical address 600 unchanged. The GEN PHY ADDR circuit 340 translates the contents of the logical address field 508 into a physical address and loads this translated physical address into field 606 of the physical address 600. The bank number specifies the particular memory bank while the offset indicates the location within that memory bank.

Once the address of the memory access request has been translated, the request is sent to the memory controller 400 where it is stored in the request queue that corresponds to the processor that issued the request.

In the illustrative embodiment, a logical address corresponds to a byte, while a physical address corresponds to a 32-bit (4-byte aligned) word.

Mirrored Read Request

Suppose processor P0 issues a Read request for a block that is mirrored at two banks. P0 generates a physical address 500 and asserts the external memory flag 502. P0 also sets field 504 depending on whether the data is in stream or block mode. P0 additionally asserts the mirror flag 506, since this address corresponds to a mirrored block. As described herein, the present invention can mirror information on the granularity of a memory block from one bank to its companion bank. That is, with the present invention, only those blocks having information that actually needs to be mirrored, e.g., frequently accessed tables, is mirrored across two memory banks. Those memory blocks of a first bank that do not contain frequently accessed information do not have to be mirrored to the first bank's companion bank. This frees up substantial space in the memory banks. In the preferred embodiment, the processors 330 "know" which blocks are mirrored across multiple banks and thus for which logical addresses the mirror flag field 506 should be asserted. For example, the microcode may be programmed with this information.

The GEN PHY ADDR circuit 340 converts the logical address into a physical address. Suppose, for example, that the physical address specifies a block in bank B2 410c, which is one of the memory banks with which processor P0 is associated. As mentioned above, the GEN PHY ADDR circuit 340 copies the contents of the logical address' stream/block flag field 504 into the physical address' stream/block flag field 602 and the contents of the logical address' mirror flag field 506 into the physical address' mirror flag field 604. The read request with the physical address is then sent to the memory controller 400 and placed at the tail of request queue 402 which is associated with P0. As requests reach the head of queue 402, they are de-queued by the top-level arbiter 422, and the remaining requests are advanced.

When the subject Read request reaches the head of request queue 402, it is examined by the top-level arbiter 422, which updates the order bitmaps 440 depending on the time at which the request reached the head of request queue 402 relative to the time at which requests reached the heads of the other request queues 403–407. The mirror flag detection circuit 432 then determines whether the mirror flag 604 of the physical address associated with the subject Read request has been asserted. In this example, the mirror flag field 604 is asserted, thereby causing the dynamic mirror engine 434 to treat the read as a dynamic mirror read. In response to a dynamic mirror read, the dynamic mirror engine 434 determines which two memory banks 410 contain the specified memory block. As indicated above, the physical address specifies a block at bank B2 410c. Suppose that the bank mapping table 436 indicates that bank B6 410g is mapped to bank B2 is 410c. In other words, a copy of the requested block exists at both bank B2 and at bank B6. In this case, the dynamic mirror engine 434 checks on the availability of state machine 414, which corresponds to bank B2 410c, and the availability of state machine 418, which corresponds to bank B6 410g, even though the request only specified bank B2. As also mentioned above, a bank state machine is considered available if it is in the available state, i.e., it does not currently have a request awaiting issuance to the external memory 280.

If either state machine 414 or 418 is available, then the necessary resources are considered to be available, and the eligible bitmap 443 is set to indicate that the subject Read request is eligible for issuance. To determine which of the eligible requests to issue during any given cycle, the compare logic 444 compares the order bitmaps 440 with the eligible bitmap 443 to determine which of the eligible requests is the oldest request. Requests only begin to age when they reach the head of their request queues. If two eligible requests have the same age, the top-level arbiter 422 may utilize the processor identifiers as a tie-breaker with lower identifiers having higher priority. For example, if processors P1 and P6 both have eligible requests that are the same age, then P1's request is selected. If no other requests are older in time than the subject Read request, it is allowed and sent the state machine that was available, e.g., state machine 418. If both state machines 414 and 418 were available, the dynamic mirror engine 434 preferably selects the one that the request specified, i.e., state machine 414. The top-level arbiter 422 passes the subject Read request from request queue 402 to state machine 418 via line 426.

At the external memory driver 430, the state machines 412–419 that have requests arbitrate for access to the external memory 280. To prevent write starvation, the bottom-level arbiter 428 can be configured to operate in a "strict" age-based arbitration scheme in which the oldest request wins arbitration even if its resources are not currently available, thereby causing the bottom-level arbiter 428 to stall subsequent requests until the resources become available and the oldest request can be issued. Alternatively, the bottom-level arbiter 428 may be configured to operate in write-defer mode, which causes the arbiter 428 to try and group reads and writes together in order to reduce bus-turn-around stalls. If two requests have the same age, the bank state machine identifiers may be used as tie-breakers, with lower identifier values having higher priority. When the subject Read request becomes the oldest request for which the necessary resources exist, it is sent to the external memory 280. The specified memory block is read from bank B6 410g and returned to P0.

As shown, the subject Read request, which specified bank B2 410c, was not stalled even though bank B2 410c was unavailable. Instead, in accordance with the present invention, assertion of the mirror flag field 604 allowed the subject Read request to be serviced by the mirrored memory bank, i.e., bank B6 410g. P0 thus receives its data faster than would otherwise occur with the prior art techniques. That is, because a Read request whose mirror flag field 604 is asserted has access to both of the associated memory banks, the Read request will typically be allowed sooner than if it has access to only a single memory bank. For example, if state machine 414 were busy servicing some other request, as was the case in the example described above, P0's Read request may still be allowed if state machine 418 (which was not specified by the Read) is available.

To read data from a memory block that is not mirrored, processor P0 preferably leaves the mirror flag field 504 of the physical address 500 de-asserted. In this case, the memory controller 400 treats the Read request, which may specify memory bank B1 410b, as a standard or normal read request. Specifically, when this Read request reaches the head of queue 402, the mirror flag detection circuit 432 concludes that the logical address' mirror flag field 604 is de-asserted. In this case, the Read request only becomes eligible when state machine 413, which handles memory bank B1 410b, is available. Since the mirror flag field 604 is not asserted, this Read request is not eligible for servicing by the memory bank that is mirrored to bank B1 410b.

As shown, whether or not the mirror flag field 506 is asserted, the processors 300 need not obtain locks on memory banks from which data is to be read. Instead, the processors simply issue their Read requests and the memory controller 400 ensures that Read requests are performed before later received requests for the specified memory blocks.

Mirrored Write Request

Suppose processor P6 wants to perform a write to a memory block that is mirrored across two memory banks, e.g., bank B3 410c and bank B7 410h. In accordance with the invention, microcode at P6 causes the processor to issue a single Write request specifying the logical address of the memory block to be written. The logical address corresponds to the particular one of the two memory banks with which P6 is associated, e.g., bank B7 410h. Processor P6 preferably asserts the mirror flag field 506 of the logical address 500. The GEN PHY ADDR circuit 340 translates the logical address 500 into a physical address 600, copying the contents of the logical address' mirror flag field 506 into the physical address' mirror flag field 604. The Write request is then sent to the memory controller 400 where it is placed at the tail of request queue 406, which corresponds to processor P6.

When the Write request reaches the head of queue 406, it is examined by the top-level arbiter 442. Specifically, the dynamic mirror engine 434 examines the mirror flag 604 and determines that it is asserted. Dynamic mirror engine 434 thus considers the subject Write request to be a dynamic mirror write request. In response, dynamic mirror engine 434 accesses the bank mapping table to determine which bank, e.g., bank B3 410d, is mapped to bank B7 410h, which is the target memory bank of the subject Write request. In this case, the top-level arbiter 422 waits until the state machine for memory bank B7 410h, i.e., state machine 419, and the state machine for memory bank B3 410d, i.e., state machine 415, are both available before considering the subject Write request to be eligible for issuance. If only one but not both state machines are available, then the necessary resources are not considered to be available by the top-level arbiter 422. Once the two state machines 415 and 419 are available, the top-level arbiter modifies the global eligible bitmap 443 accordingly, and the write is allowed, assuming it is the oldest eligible request. If it is the oldest eligible request, the top-level arbiter 422 issues the subject Write request to state machine 415 and state machine 419, thereby rendering them unavailable. State machines 415 and 419 then arbitrate for access to the external memory 280.

To make sure that writes and atomic transactions directed to a given memory bank are passed to the respective state machine before other transactions also directed to the given memory bank, but which reached the head of their request queues after the writes and atomic transactions, the top-level arbiter 422 further includes a global mirror-write request bitmap 446 and a plurality of bank-hit bitmaps, designated generally at 448. The global mirror-write request bitmap 446 and each of the bank-hit bitmaps 448 have a plurality of 1-bit bit fields, where each bit is associated with a particular request queue.

If a processor, e.g., P5, issues a mirrored write request (or a mirrored atomic transaction) to bank B6, the top-level arbiter 422 asserts the respective bit, e.g., the sixth bit, of the mirror-write request bitmap 446 when that write reaches the head of its request queue 405. Moreover, if another processor, e.g., P7, issues a request, such as a read, also for bank B6, that reaches the head of its request queue 407, then the top-level arbiter 422 asserts the sixth bit of the bank-hit bitmap 448 for request queue 407, since it is also targeting the same memory bank, i.e., bank B6, as P5's mirror write request, which is at the head of request queue 405. Every cycle, each processor's order bitmap 440, its bank-hit bitmap 448 and the global mirror-write request bitmap 446 are logically ANDed together. The result is then used in setting the processor's corresponding bit position in the eligible bitmap 443, along with the BANK AVAIL signal 424 and the MEMORY LOCK BLOCK signal 425. In other words, if a processor's request seeks the same memory bank as a mirrored write or mirrored atomic transaction and the processor's request reaches the head of its request queue after the mirrored write or atomic transaction, then the processor's request is deemed ineligible until after mirrored write or atomic transaction is issued to the state machines.

As described herein, the top-level arbiter 422 guarantees that no later requests addressing the same bank will be issued until the mirrored write or atomic is issued. This ensures that readers will see a consistent view of the data. It should be understood that, once they are issued to the state machines, requests can be taken out of order by the bottom level arbiter. It should also be understood that once the write to bank B3 from the above example completes, the updated memory block at bank B3 may be read without risking a data consistency problem, even though the write to bank B7 has yet to complete.

To write a memory block that is not mirrored at a second memory bank, a processor simply leaves the mirror flag field 506 of the logical address de-asserted. In this case, when the write reaches the head of the request queue, the dynamic mirror engine 434 concludes that the mirror flag field 604 is not asserted. Engine 434 concludes that the write is a standard or normal write. In response, the top-level arbiter 422 only looks to see whether the single specified memory bank is available. The top-level arbiter 422 does not look to see whether the other memory bank to which the specified memory bank is mapped is also available. When the single specified memory bank is available, and there are no earlier requests that have yet to be allowed, the write is issued to the state machine for the single specified memory bank. The state machine, in cooperation with the bottom-level arbiter 428, then cause the write to be performed at the single specified memory bank.

As shown, with the present invention, a processor can write to a mirrored memory block without having to lock either of the affected memory banks and without having to issue separate writes to each memory bank. Indeed, with the present invention, no locks are utilized either for read or write requests. Instead, the processor simply asserts the mirror flag field, and the memory controller 400 executes the write at the two memory banks transparently to the processor.

Furthermore, a first set of blocks at a first memory bank may be mirrored to a second memory bank by asserting the mirror flag, while a second set of blocks at the first memory bank are not mirrored. The non-mirrored portions of the first and second memory banks may thus store different information, thereby increasing the effective storage space of the external memory resource 280.

Mirrored Atomic Memory Transaction

Suppose a processor, such as P2, wishes to read a value from external memory 280, perform some operation on that value (e.g., add a number to it) and then write the result back to the same memory location. P2 preferably issues an atomic read-modify-write request that specifies the logical address 600 for the value to be read, and the number that is to be added to the value being read. If the value being read is mirrored at two banks, P2 also asserts the mirror flag field 506 of the logical address 600. The GEN PHY ADDR circuit 340 converts the logical address 500 into a physical address 600. The mirror flag field 604 of the physical address is similarly asserted. Suppose the physical address specifies bank B1. The read-modify-write request is placed at the tail of queue 404, which corresponds to P2. When the read-modify-write request reaches the head of queue 404, it is examined. The dynamic mirror engine 434 detects that the mirror flag field 604 is asserted and that the physical address specifies bank B1, whose selected memory locations are mirrored at bank B5. As the read-modify-write request includes a write component, state machine 413 (which corresponds to bank B1) and state machine 417 (which corresponds to bank B5) must be available for the read-modify-write request to be eligible for issuance by the top-level arbiter 422. When both state machines 413 and 417 are available, the eligible bitmap 443 is set accordingly, and the read-modify-write request is issued to state machine 413 and to state machine 417, assuming it constitutes the oldest eligible request.

In this case, one of the state machines, e.g., state machine 413 reads the specified value from bank B1. The state machine 413 then adds the number specified by the read-modify-write request to the value read from bank B1. Next, state machine 413 supplies the computed result to state machine 417, which is associated with bank B5. The two state machines 413 and 417 then write the computed result to banks B1 and B5, respectively, as described above in connection with mirrored write requests.

This approach saves having to do one "extra" read, i.e., the read to bank B5. It also ensures that the same value is written to both banks B1 and B5, even if the two locations contained different values prior to the atomic transaction.

As shown, the processors execute atomic transactions without having to first lock any of the memory banks.

Although the present invention has been described in connection with an 8×4 systolic array, those skilled in the art will recognize that it may be used in other types of computer architectures besides arrays. Indeed, the present invention may be used in mesh, tree or cube architectures, among others, having multiple data processing entities, such as processors and/or input/output (I/O) devices.

The foregoing description has been directed to specific embodiments of this invention. It will be apparent to those skilled in the art that other variations and modifications may be made to the described embodiments, with the attainment of some or all of the invention's advantages. For example, other arbitration schemes, such as a single-level arbiter, may be used. Therefore, it is an object of the appended claims to cover all such variations and modifications as come within the true spirit and scope of the invention.

What is claimed is:

1. In a memory controller having access to a plurality of memory banks, a method for writing data that is mirrored at two memory banks, the method comprising the steps of:

receiving a write request where the write request specifies a first memory bank by inclusion of a bank number in the write request, the write request indicating that it is a mirror write request;

identifying a second memory bank at which the data is mirrored, the second memory bank not specified in the write request;

issuing the write request to the two memory banks at which the data is mirrored; and executing the write request at the two memory banks without locking either memory bank.

2. The method of claim 1 wherein receipt of a single write request causes both memory banks to be updated.

3. The method of claim 2 wherein:

the memory controller has a plurality of state machines, and each state machine is associated with one of the memory banks, and the single write request received by the memory controller is sent to the two state machines associated with the two memory banks at which the data is mirrored.

4. The method of claim 1 wherein:

the write request includes a memory address of the first memory bank one of the memory banks, and the memory address has a flag indicating that the write request is a mirror write request.

5. The method of claim 4 wherein:
the write request is issued to the memory controller by a data processing element that is in communicating relationship with the memory controller, and
the data processing element sets the flag to indicate that the write request is a mirror write request.

6. The method of claim 5 wherein the data processing element is a processor.

7. The method of claim 1 further comprising the step of completing the write request at each memory bank before issuing another request to either of the memory banks.

8. In a memory controller having access to a plurality of memory banks, a method for reading data that is mirrored at first and second memory banks, the method comprising the steps of:
receiving a read request specifying the first memory bank by inclusion of a bank number in the read request, the read request indicating that it is a mirror read request;
identifying the second memory bank at which the data is mirrored, the second memory bank not specified in the read request; and
issuing the read request only to the second memory bank provided that the first memory bank specified by the read request is unavailable.

9. The method of claim 8 wherein:
the read request includes a memory address identifying a location within the first memory bank, and
the memory address has a flag indicating that the read request is a mirror read request.

10. The method of claim 9 wherein the flag is set by a data processing entity in communicating relationship with the memory controller to indicate that the read request is a mirror read request.

11. The method of claim 8 further comprising the steps of:
receiving a read request specifying the first memory bank, the read request indicating that it is a non-mirrored read request; and
waiting for the first memory bank becomes available before issuing the read request to the first memory bank, regardless of the availability of the second memory bank.

12. The method of claim 8 further comprising the steps of:
receiving a write request specifying a selected one of the two memory banks, the write request indicating that it is a mirror write request;
identifying the second memory bank at which the data is mirrored;
issuing the write request to the two memory banks at which the data is mirrored; and
executing the write request at the two memory banks without locking either memory bank.

13. In a memory controller having access to a plurality of memory banks, a method of performing an atomic read-modify-write transaction to data mirrored at first and second memory banks, the method comprising the steps of:
receiving an atomic read-modify-write transaction specifying the first memory bank of the two memory banks, the read-modify-write transaction indicating that it is a mirror read-modify-write transaction;
identifying the second memory bank at which the data is mirrored;
a selecting one of the first and second memory banks from which to read the data depending on the availability of the first and second memory banks;
in response to selecting the first or second memory bank, modifying the data read from that selected memory bank;
issuing the write request to the two memory banks at which the data is mirrored; and
executing the write request at the two memory banks without locking either memory bank.

14. The method of claim 13 wherein:
the atomic transaction includes a memory address identifying a location within the first memory bank, and
the memory address has a flag indicating that the atomic transaction is a mirror atomic transaction.

15. A memory controller configured to access a plurality of memory banks in which data at a first memory bank is mirrored at a second memory bank, the memory controller comprising:
a plurality of buffers for storing requests received by the memory controller, the requests specifying data stored at the memory banks;
means for identifying at least one request as a mirror read request specifying data stored at the first memory bank by inclusion of a bank number in the request;
means for identifying the second memory bank at which the data specified by the mirror read request is mirrored, the second memory bank not specified in the mirror read request;
means for selecting one of the first and second memory banks from which to read the specified data, depending on the availability of the first and second memory banks; and
means for retrieving the data from the selected one of the first and second memory banks.

16. The memory controller of claim 15 further comprising:
means for identifying at least one request as a mirror write request specifying data stored at the first memory bank;
means for identifying the second memory bank at which the data specified by the mirror write request mirrored;
issuing the write request to the two memory banks at which the data is mirrored; and
means for executing the write request at the two memory banks without locking either memory bank.

17. The memory controller of claim 16 wherein
the data at the memory banks is organized as separately addressable memory blocks, and
data is mirrored between the first and second memory banks on a block level.

18. The memory controller of claim 15 wherein
the requests include a memory address of the specified data,
the memory addresses include a mirror flag,
the means for identifying at least one request as a mirror write request utilizes the mirror flag of the memory address included with the mirror write request.

19. A method for operating a memory controller, comprising:
receiving a memory request at a first memory bank, where the memory request specifies the first memory bank by inclusion of a bank identifier in the memory request, the memory request indicating that it is a mirror memory request;
identifying, in response to the indication that it is a mirror request, a second memory bank, the second memory bank not specified in the memory request;
waiting until the first memory bank and the second memory bank are free; and executing the memory request at the first memory bank and the second memory bank;

20. The method of claim 19, further comprising:
executing the memory request immediately after both the first memory bank and the second memory bank become free.

21. The method of claim 19, further comprising:
implementing a two-level arbitration scheme for which the memory request is to be executed during any given access cycle.

22. The method of claim 21, further comprising:
determining the availability of resources by a second level of arbitration.

23. The method of claim 19, further comprising:
using microcode to program information about which blocks are mirrored in the first memory bank and the second memory bank.

24. The method of claim 19, further comprising:
determining, by a mirror flag detection circuit, whether a mirror flag of a physical address for a memory bank is associated with the memory request asserted.

25. The method of claim 19, further comprising:
stalling subsequent requests until resources in the memory controller become available and an oldest request can be issued.

26. The method of claim 19, further comprising:
receiving a write request as the memory request.

27. The method of claim 19, further comprising:
receiving a read request as the memory request.

28. A memory controller, comprising:
means for receiving a memory request at a first memory bank, where the memory request specifies the first memory bank by inclusion of a bank identifier in the memory request, the memory request indicating that it is a mirror memory request;
means for identifying, in response to the indication that it is a mirror request, a second memory bank, the second memory bank not specified in the memory request;
means for waiting until the first memory bank and the second memory bank are free; and
means for executing the memory request at the first memory bank and the second memory bank.

29. The apparatus of claim 28, further comprising:
means for executing the memory request immediately after both the first memory bank and the second memory bank become free.

30. The apparatus of claim 28, further comprising:
means for implementing a two-level arbitration scheme for which the memory request is to be executed during any given access cycle.

31. The apparatus of claim 30, further comprising:
means for determining the availability of resources by a second level of arbitration.

32. The apparatus of claim 28, further comprising:
means for using microcode to program information about which blocks are mirrored in the first memory bank and the second memory bank.

33. The apparatus of claim 28, further comprising:
means for determining, by a mirror flag detection circuit, whether a mirror flag of a physical address for a memory bank is associated with the memory request asserted.

34. The apparatus of claim 28, further comprising:
means for stalling subsequent requests until resources in the memory controller become available and an oldest request can be issued.

35. The apparatus of claim 28, further comprising:
means for receiving a write request as the memory request.

36. The apparatus of claim 28, further comprising:
means for receiving a read request as the memory request.

37. A memory controller, comprising:
the memory controller configured to receive a memory request that specifies a first memory bank by inclusion of a bank identifier in the memory request the memory request indicating that it is a mirror memory request;
the memory controller configured to identify a second memory bank, in response to the indication that it is a mirror memory request, the second memory bank not specified in the memory request;
the first memory bank and the second memory bank configured to wait until both the first memory bank and the second memory bank are free; and
the first memory bank and the second memory bank configured to execute the memory request at the same time.

38. The controller of claim 37, further comprising:
the first memory bank and the second memory bank are configured to execute the memory request immediately after both become free.

39. The controller of claim 37, further comprising:
a two-level arbitration scheme for determining which memory request is to be executed during any given access cycle.

40. The controller of claim 39, further comprising:
a second level of arbitration for determining the availability of resources.

41. The controller of claim 37, further comprising:
a microcode to program information about which blocks are mirrored in the first memory bank and the second memory bank.

42. The controller of claim 37, further comprising:
a mirror flag detection circuit to determine whether a mirror flag of a physical address for a memory bank is associated with the memory request asserted.

43. The controller of claim 37, further comprising:
the memory controller configured to stall subsequent requests until resources become available and an oldest request can be issued.

44. The controller of claim 37, further comprising:
the memory request is a write request.

45. The controller of claim 37, further comprising:
the memory request is a read request.

46. The method of claim 8 wherein the first memory bank is unavailable due to the first memory bank servicing another memory access request when the step of issuing is performed.

47. A memory controller having access to a plurality of memory banks, the memory controlled adapted to read data that is mirrored at first and second memory banks, the memory controller comprising:
a request queue configured to receive a read request specifying a first memory bank by inclusion of a bank number in the read request, the read request having a flag that indicates the read request is a mirror read request; and
an arbiter configured to identify the second memory bank at which the data is mirrored, the second memory bank not specified in the read request, end to issue the read request only to the second memory bank provided the first memory bank specified by the read request is unavailable.

48. The memory controller of claim 47 wherein:
the read request includes a memory address identifying a location within the first memory bank.

49. The memory controller of claim 47 wherein the arbiter further comprises:
a plurality of state machines, each state machine associated with one of the memory banks and configured to receive any read requests for the memory bank.

50. The memory controller of claim 49 wherein the arbiter further comprises:
a top-level arbiter configured to determine if the request queue holds a request; and
a bottom-level arbiter configured to monitor the availability of the plurality of memory banks.

51. The memory controller of claim 50 wherein the plurality of state machines are a part of the bottom-level arbiter.

52. The memory controller of claim 47 wherein:
the request queue is further configured to receive a second read request specifying the first memory bank, the second read request indicating that it is a non-mirrored read request; and
the arbiter is further configured to wait for the first memory bank to become available before issuing the second read request to the first memory bank, regardless of the availability of the second memory bank.

53. The memory controller of claim 52 wherein the first memory bank is unavailable due to the pendency of another memory access request at the first memory bank.

54. A memory controller having access to a plurality of memory banks, the memory controller adapted to perform an atomic read-modify-write transaction on data mirrored at first and second memory banks, the memory controller comprising:
a request queue configured to receive an atomic read-modify-write transaction that specifies the first memory bank of the two memory banks, the read-modify-write transaction having a flag that indicates the read-modify-write transaction is a mirror read-modify-write transaction; and
an arbiter configured to, in response to the read-modify-write transaction, identify the second memory bank at which the data is mirrored and to select one of the first and second memory banks from which to read the data based on the availability of the first and second memory banks, and to modify the data read from that selected memory bank and, to write to the two memory banks at which the data is mirrored.

55. The memory controller of claim 54 wherein the atomic read-modify-write transaction includes a memory address identifying a location within the first memory bank.

56. The memory controller of claim 54 wherein the arbiter further comprises:
a plurality of state machines, each state machine associated with one of the memory banks and configured to receive any requests for the memory bank.

57. The memory controller of claim 56 wherein the arbiter further comprises:
a top-level arbiter configured to determine if the request queue holds a request; and
a bottom-level arbiter configured to monitor the availability of the plurality of memory banks.

58. The memory controller of claim 57 wherein the plurality of state machines are a part of the bottom-level arbiter.

59. A memory controller having access to a plurality of memory banks, the memory controller adapted to perform an atomic read-modify-write transaction on data mirrored at first and second memory banks, the memory controller comprising:
means for receiving an atomic read-modify-write transaction specifying the first memory bank of the two memory banks, the read-modify-write transaction indicating that the read-modify-write transaction is a mirror read-modify-write transaction;
means for identifying the second memory bank at which the data is mirrored;
means for selecting one of the first and second memory banks from which to read the data depending on the availability of the first and second memory banks;
means for modifying the data read from that selected memory bank; and
means for writing the modified data to the two memory banks at which the data is mirrored.

60. The memory controller of claim 59 wherein the atomic read-modify-write transaction comprises:
a means for identifying a location within the first memory bank.

61. A computer readable medium containing executable program instructions to perform an atomic read-modify-write transaction on data mirrored at first and second memory banks, the executable program instructions comprising program instructions adapted to:
receive an atomic read-modify-write transaction specifying the first memory bank of the two memory banks, the read-modify-write transaction indicating that it is a mirror read-modify-write transaction;
identify the second memory bank at which the data is mirrored;
select one of the first and second memory banks from which to read the data depending on the availability of the first and second memory banks;
modify the data read from that selected memory bank; and
write the modified data to the two memory banks at which the data is mirrored.

62. The memory controller of claim 59 further comprising:
means for determining if a request queue holds a request; and
means for monitoring the availability of the plurality of memory banks.

63. The memory controller of claim 62 wherein the means for receiving is a part of the means for monitoring.

* * * * *